US008255706B2

(12) United States Patent
Chen et al.

(10) Patent No.: US 8,255,706 B2
(45) Date of Patent: Aug. 28, 2012

(54) DUAL USAGE SMART CARD OF CPU AND LOGICAL ENCRYPTION AND ITS DATA SYNCHRONIZATION METHOD

(75) Inventors: Dacai Chen, Beijing (CN); Daxing Xu, Beijing (CN); Tongxin Qi, Beijing (CN)

(73) Assignee: Beijing Watch Data System Co., Ltd., Chaoyang District, Beijing ( * ) Notice: Subject to any disclaimer, the term of this patent is extended or adjusted under 35 U.S.C. 154(b) by 485 days.

(21) Appl. No.: 12/518,832

(22) PCT Filed: Dec. 7, 2007

(86) PCT No.: PCT/CN2007/003490
§ 371 (c)(1),
(2), (4) Date: Jun. 11, 2009

(87) PCT Pub. No.: WO2008/077306
PCT Pub. Date: Jul. 3, 2008

(65) Prior Publication Data
US 2010/0017613 A1 Jan. 21, 2010

(30) Foreign Application Priority Data

Dec. 26, 2006 (CN) .......................... 2006 1 0169637

(51) Int. Cl.
*H04L 29/06* (2006.01)
(52) U.S. Cl. ........................................ 713/193; 235/380
(58) Field of Classification Search .................. 713/191, 713/375, 400, 168, 167, 193, 172; 726/9, 726/20; 380/287, 26, 283; 705/64, 65, 66, 705/68; 235/380
See application file for complete search history.

(56) References Cited

U.S. PATENT DOCUMENTS

| 5,890,169 | A  | 3/1999  | Wong et al.  |
| 6,564,995 | B1 | 5/2003  | Montgomery   |
| 6,970,891 | B1 | 11/2005 | Deo et al.   |
| 7,350,049 | B1 | 3/2008  | Li et al.    |

(Continued)

FOREIGN PATENT DOCUMENTS

CN 1285549 A 2/2001

(Continued)

OTHER PUBLICATIONS

International Search Report for PCT Application No. CN2006/001919, dated Nov. 30, 2006.

(Continued)

*Primary Examiner* — Gilberto Barron, Jr.
*Assistant Examiner* — Izunna Okeke
(74) *Attorney, Agent, or Firm* — Knobbe Martens Olson & Bear LLP

(57) ABSTRACT

A dual usage smart card of CPU and logical encryption and its data synchronization method. Said method comprises that a CPU command processing module controls an accessing control module for the logical encryption storage region to read the data in the logical encryption storage region to a data format conversion module; said data format conversion module transmits the data to the CPU control storage region; the CPU command processing module controls the CPU control storage region again to transmit the data of CPU card to the accessing control module for the logical encryption storage region through the data format conversion module; and said accessing control module for the logical encryption storage region writes the data of CPU card into the logical encryption storage region.

8 Claims, 2 Drawing Sheets

U.S. PATENT DOCUMENTS

| | | | |
|---|---|---|---|
| 7,529,817 B2 | 5/2009 | Kim | |
| 2004/0256470 A1* | 12/2004 | Takami et al. | 235/492 |
| 2005/0050108 A1 | 3/2005 | Sawant et al. | |
| 2006/0020745 A1 | 1/2006 | Conley et al. | |
| 2006/0041709 A1 | 2/2006 | Nishiura | |
| 2006/0149916 A1 | 7/2006 | Nase | |
| 2006/0194595 A1 | 8/2006 | Myllynen et al. | |

FOREIGN PATENT DOCUMENTS

| | | |
|---|---|---|
| CN | 1308750 | 8/2001 |
| CN | 1345154 A | 4/2002 |
| CN | 2514594 Y | 10/2002 |
| CN | 1118025 C | 8/2003 |
| CN | 1529524 A | 9/2004 |
| CN | 1545072 A | 11/2004 |
| CN | 1585512 A | 2/2005 |
| CN | 1632765 A | 6/2005 |
| CN | 1687905 A | 10/2005 |
| CN | 1744090 A | 3/2006 |
| CN | 17910388 | 6/2006 |
| CN | 100351812 C | 11/2007 |
| EP | 1 513 098 A2 | 3/2005 |
| JP | 11-110510 | 4/1999 |
| JP | 2003-288258 A | 10/2003 |
| JP | 2004-192447 | 7/2004 |
| JP | 2005-141335 A | 6/2005 |
| WO | WO 99/57675 | 11/1999 |
| WO | WO 2005/071990 A1 | 8/2005 |

OTHER PUBLICATIONS

International Preliminary Report on Patentability issued on Sep. 23, 2008 in PCT/CN2007/000427, filed Feb. 7, 2007.

International Search Report mailed May 31, 2007 in PCT/CN2007/000427, filed Feb. 7, 2007.

Microsoft, "Microsoft Extensible Firmware Initiative FAT32 File System Specification", FAT: General Overview of On-Disk Format, Microsoft Hardware White Paper, pp. 1-34, dated Dec. 6, 2000. Cited in International Search Report PCT/CN2007/000427 mailed May 31, 2007, as "Microsoft Extensible Firmware Initiative FAT32 File System Specification, FAT: General Overview of On-Disk Format, Version 1.03, <URL http://www.microsoft.com/whdc/system/platform/firmware/fatgen.mspx> (Microsoft Corporation), Dec. 6, 2000."

International Preliminary Report on Patentability issued on Oct. 8, 2008 in PCT Application No. PCT/CN2007/000286.

International Search Report issued on May 17, 2007 in PCT Application No. PCT/CN2007/000286.

Ready, James F. VRTX: A Real-Time Operating System for Embedded Microprocessor Applications, IEEE Micro. 6(4), Aug. 1986, pp. 8-17.

Microtec. VRTXsa Real-Time Kernel: Programmer's Guide and Reference (1997).

Domingo-Ferrer, Josep. Multi-Application Smart Cards and Encrypted Data Processing, Future Generation Computer Systems, 13:65-74 (1997).

International Search Report dated Mar. 20, 2008 in International Application No. PCT/CN2007/003490.

Office Action dated Jan. 21, 2009 for Chinese Patent Application No. 2006101696379.

Office Action dated Nov. 7, 2011 for Japanese Patent Application No. 2009-543327.

Written Opinion mailed May 13, 2010 for Singapore Patent Application No. 200904128-6.

Invitation to Respond to Written Opinion dated Aug. 3, 2010 for Singapore Patent Application No. 200904128-6.

Written Opinion mailed Apr. 6, 2011 for Singapore Patent Application No. 200904128-6.

Invitation to Respond to Written Opinion dated May 3, 2011 for Singapore Patent Application No. 200904128-6.

Examination Report dated Dec. 22, 2011 for Singapore Patent Application No. 200904128-6.

* cited by examiner

DUAL USAGE SMART CARD OF CPU AND LOGICAL ENCRYPTION AND ITS DATA SYNCHRONIZATION METHOD

BACKGROUND OF THE INVENTION

1. Field of the Invention

The present invention relates to a smart card data storing device and an internal data synchronizing method, and particularly to a dual usage smart card of CPU and logical encryption and a data sync method thereof.

2. Description of the Related Art

Each of a logical encryption card and a CPU card is one kind of IC card. Compared to the logical encryption card, the CPU card has such advantages as a fast processing speed, a high safety and a great flexibility, etc., and is taking the place of the logical encryption card step by step. However, the logical encryption card has been applied in many projects and if the logical encryption card is directly replaced with the CPU card, it cannot help but resulting in that all the existing logical encryption card reading devices and terminals should be replaced, the cost of which is over high and is difficult to be accepted. In order to solve the problem, some chip manufacturers provide a new kind of CPU chip, which adds a logical encryption circuit and a logical encryption storage area. A card encapsulated by using this kind of chip can be used as both a CPU card and a logical encryption card. That is, a same card can support both a terminal for reading a CPU card and a terminal for reading a logical encryption card. While the hardware problem has been solved, there is a software problem: when a card is used as a CPU card, data are stored in a CPU controlled storage area; and when the card is used as a logical encryption card, data are stored in a logical encryption storage area, thereby achieving that a logical encryption card and a CPU card appear to be a same card and a unity, but the data therebetween are inconsistent. When a logical encryption card and a CPU card act as a common application, it is desirable that the corresponding data in the two storage areas should be consistent, thus ensuring a correct state is kept in each of the logical encryption card terminal environment and the CPU card terminal environment, respectively. But at present, the problem of data sync therebetween has not been solved, yet.

SUMMARY OF THE INVENTION

In view of the defects and disadvantages existed in the art, certain embodiments provide a dual usage smart card of CPU and logical encryption and its data synchronization method, which can ensure that data stored in a logical encryption card and a CPU card keep consistent when communicating with the outside.

One embodiment provides a dual usage smart card of CPU and logical encryption which comprises a CPU card system for communicating with a CPU card reading device and a logical encryption card system for communicating with a logical encryption card reading device, wherein the CPU card system comprises a CPU controlled storage area for storing CPU card data, the logical encryption card system comprises a logical encryption storage area for storing logical encryption card data, and the CPU card system further comprises a data sync device for data sync between the CPU controlled storage area and the logical encryption storage area, the data sync device being connected with the CPU controlled storage area and the logical encryption storage area, respectively.

In the dual usage smart card of CPU and logical encryption, the data sync device comprises:

a CPU command processing module for controlling a logical encryption storage area access control module and the CPU controlled storage area, and implementing data interaction between the CPU controlled storage area and the logical encryption storage area;

a data format conversion module for implementing format conversion between the logical encryption card data and the CPU card data; and the logical encryption storage area access control module for implementing reading and writing of the logical encryption card data in the logical encryption storage area;

wherein, the CPU command processing module controls the logical encryption storage area access control module to read the data in the logical encryption storage area to the data format conversion module which forwards the data to the CPU controlled storage area; and the CPU command processing module further controls the CPU controlled storage area, sends the CPU card data, through the data format conversion module, to the logical encryption storage area access control module which writes the CPU card data into the logical encryption storage area.

Another embodiment provides a data sync method of a dual usage smart card of CPU and logical encryption, comprising the steps of:

(1) invoking the logical encryption card data to update the CPU card data before each time the CPU card system communicates with the CPU card reading device;

(2) completing communication between the CPU card system and the CPU card reading device; if the communication is that the CPU card reading device reads the CPU card data, terminating the step; and if the communication is that the CPU card reading device modifies the CPU card data, proceeding to the next step;

(3) invoking the CPU card data to update the logical encryption card data.

Specifically, step (1) further comprises the steps of:

(11) controlling the logical encryption storage area access control module to read the data in the logical encryption storage area to the data format conversion module, by the CPU command processing module; and

(12) converting a data format of the data from a logical encryption card format to a CPU card format, forwarding the data to the CPU controlled storage area and updating the data therein, by the data format converting module.

Further, if, in step (2), the communication is that the CPU card reading device modifies the CPU card data, then the communication process is specifically that: after the CPU controlled storage area backs up present data, it accepts the modification to the CPU card data by the CPU card reading device, and if the modification is successful, the process proceeds to step (3); otherwise, the present data are restored by using the backed up data, and the process terminates.

Specifically, step (3) comprises the steps of:

(31) controlling the CPU controlled storage area and sending the CPU card data to the data format conversion module, by the CPU command processing module;

(32) converting a data format of the data from a CPU card format to a logical encryption card format and forwarding the data to the logical encryption storage area access control module, by the data format converting module; and

(33) writing the CPU card data into the logical encryption storage area by the logical encryption storage area access control module.

As an improvement, step (33) is specifically that: the logical encryption storage area access control module writes the CPU card data into the logical encryption storage area; if the writing is successful, the step terminates; and the writing fails, the CPU controlled storage area restores the present data by using the backed up data, and the step terminates.

One embodiment invokes logical encryption card data to update CPU card data before each time the CPU card system communicates with the outside, by using the data sync device connecting with the CPU controlled storage area and the logical encryption storage area respectively. If the CPU card data change after the CPU card system communicates with the outside, the data sync device invokes the CPU card data again to update the logical encryption card data, thus being capable of ensuring, before and after each time the CPU card system communicates with the outside, the CPU card data keeps consistent with the logical encryption card data, thereby implementing a card of dual usage indeed.

DETAILED DESCRIPTION OF CERTAIN EMBODIMENTS

A further detailed description of the embodiments will be provided below in combination with the drawings.

Figure 1:
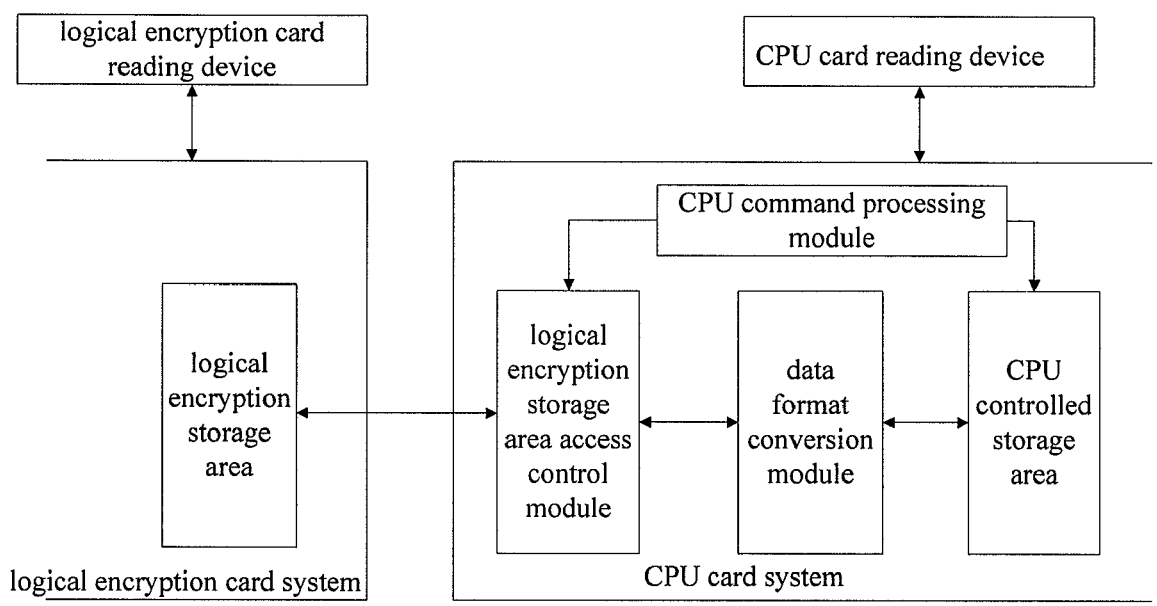
FIG. 1 is a structural diagram of a dual usage smart card of CPU and logical encryption according to one embodiment.

As shown in FIG. 1, the dual usage smart card of CPU and logical encryption according to one embodiment comprises a CPU card system for communicating with a CPU card reading device and a logical encryption card system for communicating with a logical encryption card reading device, wherein the CPU card system comprises a CPU controlled storage area for storing CPU card data, and the logical encryption card system comprises a logical encryption storage area for storing logical encryption card data. In another embodiment the CPU card system further comprises a data sync device for data sync between the CPU controlled storage area and the logical encryption storage area, the data sync device being connected with the CPU controlled storage area and the logical encryption storage area, respectively.

The data sync device comprises:

a CPU command processing module for controlling a logical encryption storage area access control module and the CPU controlled storage area, and implementing data interaction between the CPU controlled storage area and the logical encryption storage area;

a data format conversion module for implementing format conversion between the logical encryption card data and the CPU card data; and the logical encryption storage area access control module for implementing reading and writing of the logical encryption card data in the logical encryption storage area.

The operational process of the device is as follows: the CPU command processing module controls the logical encryption storage area access control module to read the data in the logical encryption storage area to the data format conversion module which forwards the data to the CPU controlled storage area; and the CPU command processing module further controls the CPU controlled storage area, sends the CPU card data, through the data format conversion module, to the logical encryption storage area access control module which writes the CPU card data into the logical encryption storage area.

A data sync method with regard to the CPU card system and the logical encryption card system of the device comprises the following steps:

(1) Before each time the CPU card system communicates with the CPU card reading device, it invokes the logical encryption card data to update the CPU card data.

Step (1) further comprises the following steps:

(11) the CPU command processing module detects the CPU card reading device to determine it is to communicate, and before the CPU card system communicates with the CPU card reading device, the CPU command processing module controls the logical encryption storage area access control module to read the data in the logical encryption storage area to the data format conversion module; and

(12) the data format converting module converts a data format of the data from a logical encryption card format to a CPU card format, forwards the data to the CPU controlled storage area and updates the data therein.

(2) The CPU card system and the CPU card reading device complete communication therebetween; if the communication is that the CPU card reading device reads the CPU card data, the process terminates; and if the communication is that the CPU card reading device modifies the CPU card data, the process proceeds to the next step.

In order to enhance the reliability of the communication operation, if, in step (2), the communication is that the CPU card reading device modifies the CPU card data, then the communication process is specifically that: after the CPU controlled storage area backs up the present data, it accepts the modification to the CPU card data by the CPU card reading device, and if the modification is successful, the process proceeds to step (3); otherwise, the present data are restored by using the backed up data, and the process terminates.

(3) The CPU card data is invoked to update the logical encryption card data. Step (3) comprises the following steps:

(31) the CPU command processing module controls the CPU controlled storage area and sends the CPU card data to the data format conversion module;

(32) the data format converting module converts a data format of the data from a CPU card format to a logical encryption card format and forwards the data to the logical encryption storage area access control module; and

(33) the logical encryption storage area access control module writes the CPU card data into the logical encryption storage area.

Also, in order to enhance the reliability of the communication operation, in step (33), the logical encryption storage area access control module writes the CPU card data into the logical encryption storage area; if the writing is successful, the step terminates; and the writing fails, the CPU controlled storage area restores the present data by using the backed up data, and the step terminates.

One embodiment is mainly based on the following thought: the logical encryption card system do not have the capability of accessing the CPU card system due to lack of a control chip capable of performing a control operation on the system, similar to that of a CPU, thus it may depend on the CPU card system to achieve data sync between the CPU card system and the logical encryption card system.

Specifically, by using the device of according to one embodiment, only before each time the CPU card system communicates with the outside (the CPU card reading device), the CPU command processing module controls the logical encryption storage area access control module to read the data in the logical encryption storage area into the data format conversion module which forwards the data to the CPU controlled storage area, thus implementing the first data sync between the CPU card system and the logical encryption card system. Before the data sync of this time, the logical encryption card system may communicate with the outside (the logical encryption card reading device) for several times, during which period no sync operation is necessary. Since the data of the CPU card system and the data of the logical encryption card system are inconsistent, and only when both the CPU card system and the logical encryption card system communicate with the outside, respectively, can a bad effect be produced (e.g., resulting in the billings of the outside card reading systems are inconsistent), it can work as long as the data in the CPU controlled storage area keep consistent with those in the logical encryption storage area before each time the CPU card system communicates with the outside. In the daily life, the communication between the CPU card system and the outside is divided into such two kinds as that the CPU card reading device reads the CPU card data and that the CPU card reading device modifies the CPU card data. That the CPU card reading device reads the CPU card data can be understood as that a card holder wants to check data information in the card only through the CPU card reading device or terminal (e.g., how much money is left in the card), this kind of operation will not change the data in the CPU controlled storage area, and thus no data sync between the logical encryption storage area and the CPU controlled storage area is necessary after completing the communication of this time. That the CPU card reading device modifies the CPU card data can be understood as that a card holder changes the data information in the card by using the CPU card reading device (e.g., payment is done by using a credit card, the money in the credit card changes before and after the payment by using the credit card). Since this kind of operation changes the data in the CPU controlled storage area so as to make the data in the CPU controlled storage area and those in the logical encryption storage area inconsistent, it is desirable that data in the CPU controlled storage area be made synchronized with those in the logical encryption storage area after the communication of this time is completed. The specific process is as follows: after each time the CPU card system communicates with the outside (the CPU card reading device) (the CPU card reading device modifies the CPU card data), the CPU command processing module controls again the CPU controlled storage area, and sends the CPU card data, through the data format conversion module, to the logical encryption storage area access control module which writes the CPU card data into the logical encryption storage area. Thus, after the data sync for the second time, it is realized that the data in the logical encryption storage area are kept consistent with those in the CPU controlled storage area, thus implementing data sync between the CPU card system and the logical encryption card system of this time.

Figure 2:
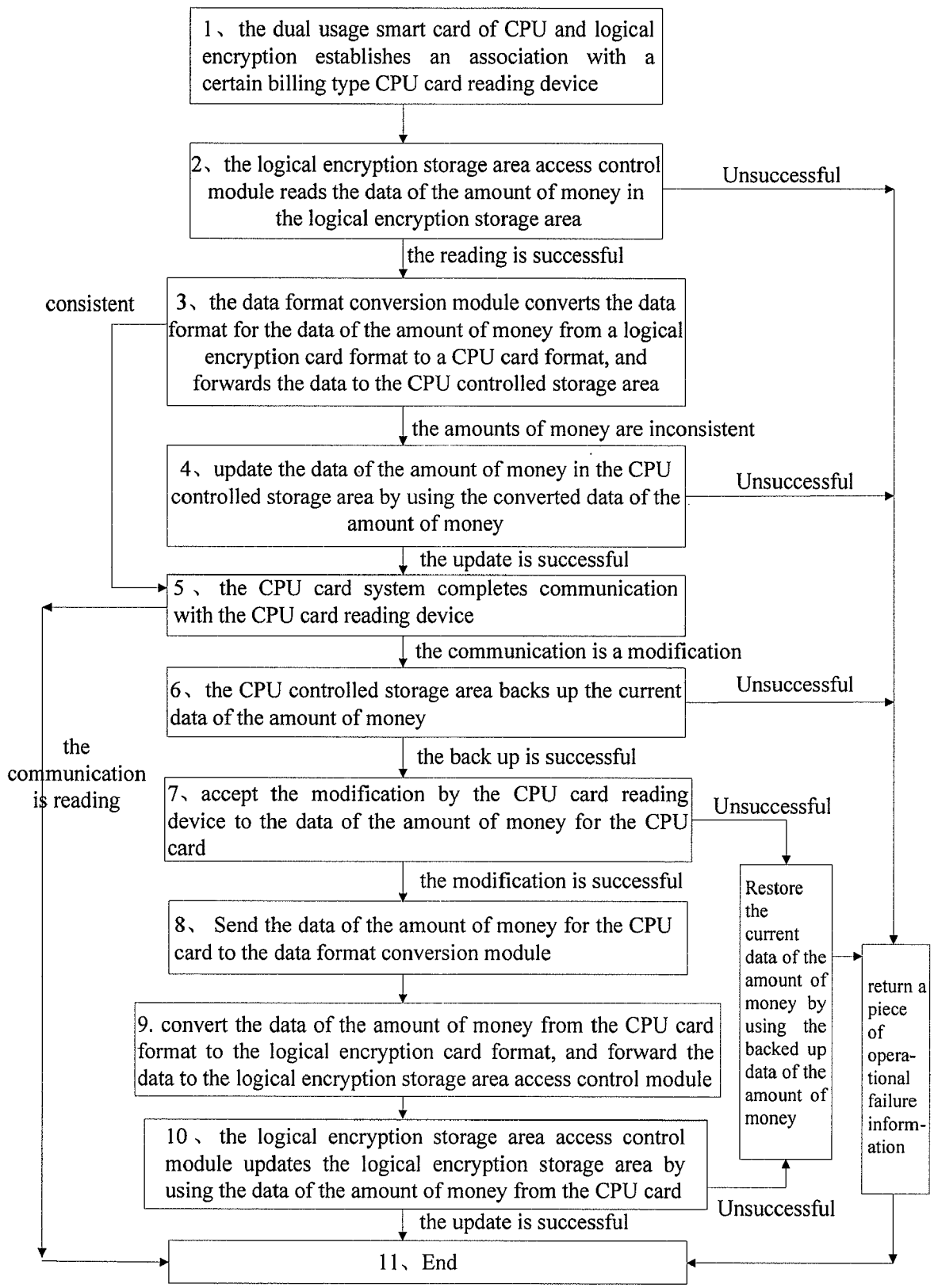
FIG. 2 is a dual usage smart card of a CPU and logical encryption and the flowchart of data sync thereof according to another embodiment.

The flow of the present method is detailed below by using an embodiment of a purse application:

As shown in FIG. 2, when operating the corresponding data in the CPU controlled storage area and the logical encryption storage area (e.g., when it is a purse application, both the CPU controlled storage area and the logical encryption storage area store amounts of money which are the corresponding data), data sync should be initiated, and the flow is as follows:

1) the smart card for both a CPU and logical encryption establishes an association with a certain billing type CPU card reading device;

2) the CPU command processing module controls the logical encryption storage area access control module to read the data of the amount of money in the logical encryption storage area into the data format conversion module; if the reading is successful, the process proceeds to the next step; otherwise, a piece of operational failure information is returned to the CPU card reading device, and the process proceeds to step 11);

3) the data format conversion module converts the data format for the data of the amount of money from a logical encryption card format into a CPU card format, and forward the data to the CPU controlled storage area; if the converted data of the amount of money are inconsistent with the data of the amount of money in the CPU controlled storage area, the process proceeds to the next step; otherwise, the process proceeds to step 5);

4) the data of the amount of money in the CPU controlled storage area is updated by using the converted data of the amount of money; if the update is successful, the process proceeds to the next step; otherwise, a piece of operational failure information is returned to the CPU card reading device, and the process proceeds to step 11);

5) the CPU card system completes communication with the CPU card reading device; if the communication is that the CPU card reading device reads the data of the amount of money for the CPU card, the process proceeds to step 11); and if the communication is that the CPU card reading device modifies the data of the amount of money for the CPU card, the process proceeds to the next step;

6) the CPU controlled storage area backs up the current data of the amount of money; when the backup is successful, the process proceeds to the next step; otherwise, a piece of operational failure information is returned to the CPU card reading device, and the process proceeds to step 11);

7) the modification by the CPU card reading device to the data of the amount of money for the CPU card is accepted; if the modification is successful, the process proceeds to the next step; otherwise, the current data of the amount of money in the CPU controlled storage area are restored by using backed up data of the amount of money, and a piece of operational failure information is returned to the CPU card reading device, and the process proceeds to step 11);

8) the CPU command processing module controls the CPU controlled storage area to send the data of the amount of money for the CPU card to the data format conversion module;

9) the data format conversion module converts the data format of the data of the amount of money into the logical encryption card format, and forward the data to the logical encryption storage area access control module;

10) the logical encryption storage area access control module updates the logical encryption storage area by using the data of the amount of money for the CPU card; if the update is successful, the process proceeds to the next step; otherwise, the CPU controlled storage area restores the current data of the amount of money by using the backed up data of the amount of money, and a piece of operational failure information is returned to the CPU card reading device, and the process proceeds to next step;

11) the process terminates.

By using the device and method according to the embodiments described above, it can ensure the consistency between the data of the logical encryption card system and those of the CPU card system be kept effectively. Although the operation for the data in the logical encryption storage area temporally results in out of sync between the two storage areas, the operation for the data in the CPU controlled storage area can always enable data sync between the two storage areas, and a user can not perceive the existence of out of sync.

It needs to be pointed out that here that what is provided above are only certain embodiments of the present invention, the present invention can further enumerate many other embodiments. For example, the application field is not limited to the purse application, and can further be all fields that need only one smart card to make data interaction with various types of card reading devices, such as the fields of an electric meter and a water meter. In addition, the applications in the present invention are also not limited to that between the logical encryption card system and the CPU card system, and can also be data sync between the CPU card system and another card-carried data reading system (such as a card reading-only system), which has an essentially same flow as that of the present embodiment, and also belongs to the protection scope of the present invention.

What is claimed is:

1. A dual usage smart card of CPU and logical encryption, comprising:
    a CPU card system configured to communicate with a CPU card reading device and
    a logical encryption card system configured to communicate with a logical encryption card reading device, the CPU card system comprising a CPU controlled storage area for storing CPU card data, and the logical encryption card system comprising a logical encryption storage area for storing logical encryption card data,
    wherein the CPU card system further comprises a data sync device configured to sync data between the CPU controlled storage area and the logical encryption storage area, the data sync device being coupled to the CPU controlled storage area and the logical encryption storage area, respectively,
    the data sync device further configured to invoke the logical encryption card data to update the CPU card data before each time the CPU card system communicates with the CPU card reading device; completing communication between the CPU card system and the CPU card reading device; and invoking the CPU card data to update the logical encryption card data if the communication is that the CPU card reading device modifies the CPU card data.

2. The dual usage smart card of CPU and logical encryption according to claim 1, wherein the data sync device comprises:
    a CPU command processing module configured to control a logical encryption storage area access control module and the CPU controlled storage area, and configured to implement data interaction between the CPU controlled storage area and the logical encryption storage area;
    a data format conversion module configured to implement format conversion between the logical encryption card data and the CPU card data; and
    wherein the logical encryption storage area access control module is configured to implement reading and writing of the logical encryption card data in the logical encryption storage area;
    wherein, the CPU command processing module is further configured to control the logical encryption storage area access control module to read the data in the logical encryption storage area to the data format conversion module which forwards the data to the CPU controlled storage area; and wherein the CPU command processing module is further configured to control the CPU controlled storage area, send the CPU card data, through the data format conversion module, to the logical encryption storage area access control module which writes the CPU card data into the logical encryption storage area.

3. A data sync method of a dual usage smart card of CPU and logical encryption, the method comprising:
    invoking a CPU card system to communicate with a CPU card reading device;
    storing CPU card data in a CPU controlled storage area within the CPU card system;
    invoking a logical encryption card system to communicate with a logical encryption card reading device;
    storing logical encryption card data in a logical encryption storage area with the logical encryption card system;
    syncing data between the CPU controlled storage area and the logical encryption storage area;
    invoking the logical encryption card data to update the CPU card data before each time the CPU card system communicates with the CPU card reading device;
    completing communication between the CPU card system and the CPU card reading device; and
    invoking the CPU card data to update the logical encryption card data, if the communication is that the CPU card reading device modifies the CPU card data.

4. The data sync method of a dual usage smart card of CPU and logical encryption according to claim 3, the invoking comprising:
    controlling the logical encryption storage area access control module to read the data in the logical encryption storage area to the data format conversion module, by the CPU command processing module; and
    converting a data format of the data from a logical encryption card format to a CPU card format, forwarding the data to the CPU controlled storage area and updating the data therein, by the data format converting module.

5. The data sync method of a dual usage smart card of CPU and logical encryption according to claim 3, the method further comprising: if, during the completing communication, the communication is that the CPU card reading device modifies the CPU card data, then the communication process comprises: after the CPU controlled storage area backs up present data, it accepts the modification to the CPU card data by the CPU card reading device, and if the modification is successful, proceeding to the invoking; otherwise, the present data are restored by using the backed up data and the invoking is not performed.

6. The data sync method of a dual usage smart card of CPU and logical encryption according to claim 3, wherein the invoking comprises:
    controlling the CPU controlled storage area and sending the CPU card data to the data format conversion module, by the CPU command processing module;
    converting a data format of the data from a CPU card format to a logical encryption card format and forwarding the data to the logical encryption storage area access control module, by the data format converting module; and
    writing the CPU card data into the logical encryption storage area by the logical encryption storage area access control module.

7. The data sync method of a dual usage smart card of CPU and logical encryption according to claim 5 wherein the writing comprises: writing, using the logical encryption storage area access control module, the CPU card data into the logical encryption storage area; and restoring, using the CPU controlled storage area, the present data by using the backed up data if the writing fails.

8. The data sync method of a dual usage smart card of CPU and logical encryption according to claim 6, wherein the writing comprises: writing, using the logical encryption storage area access control module, the CPU card data into the logical encryption storage area; and restoring, using the CPU controlled storage area, the present data by using the backed up data if the writing fails.

* * * * *